June 2, 1931. F. ASHWORTH 1,807,818
HEEL MAKING MACHINE
Filed Feb. 20, 1922 8 Sheets-Sheet 4
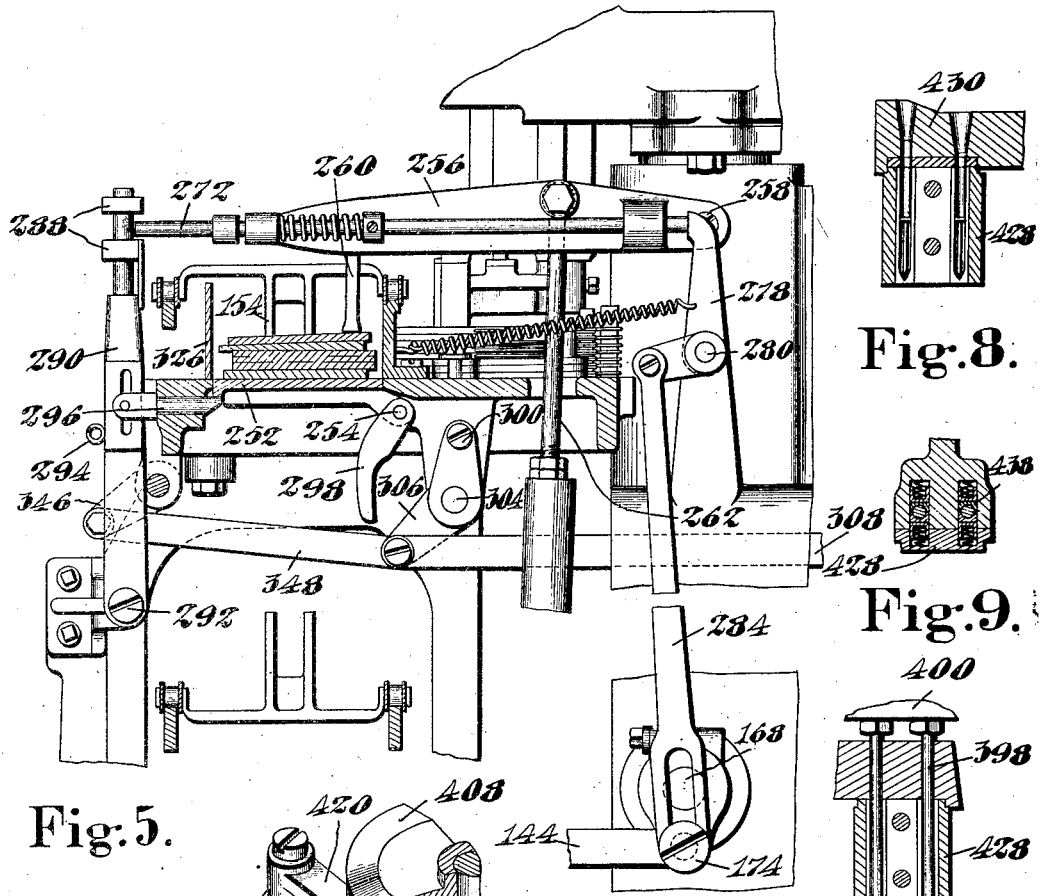
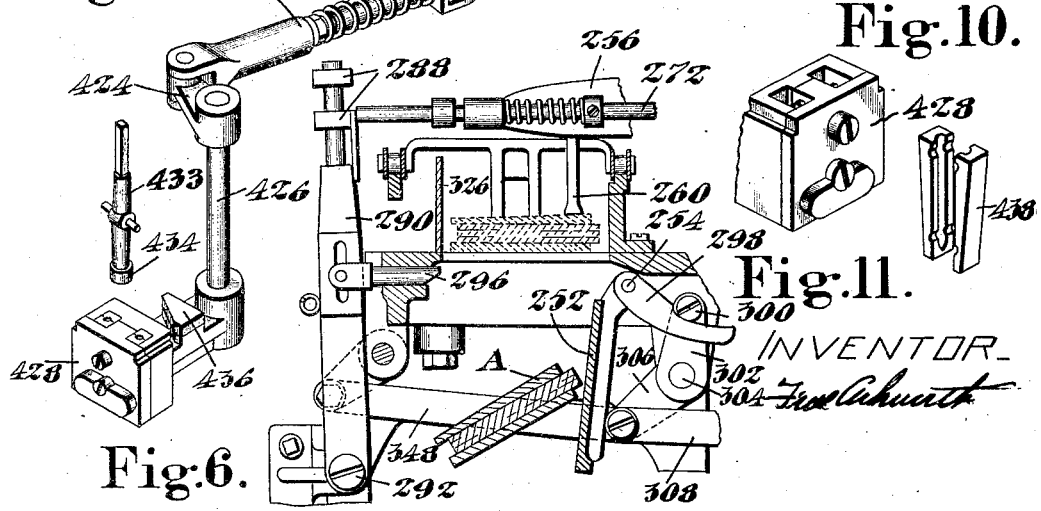
INVENTOR
Fred Ashworth

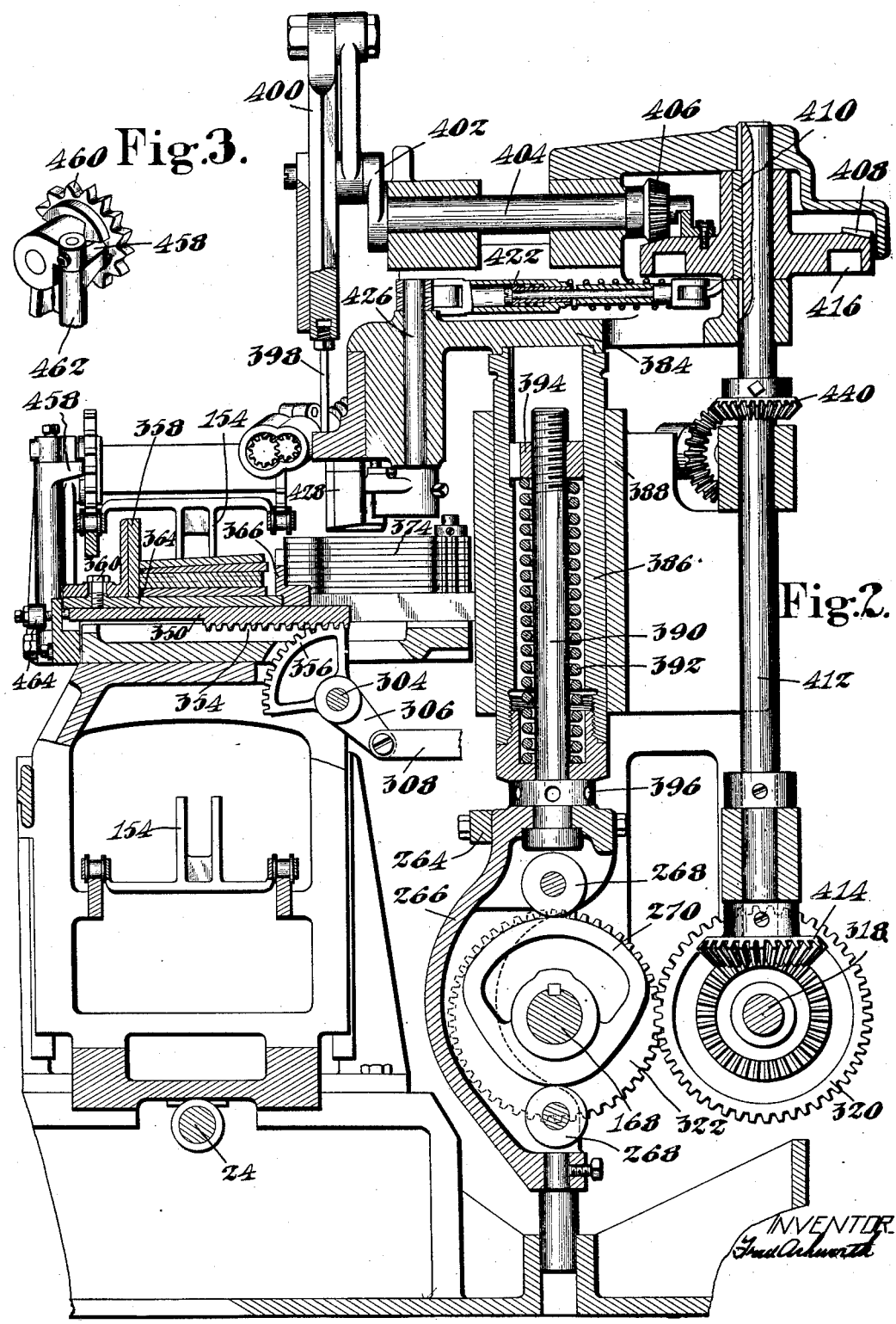

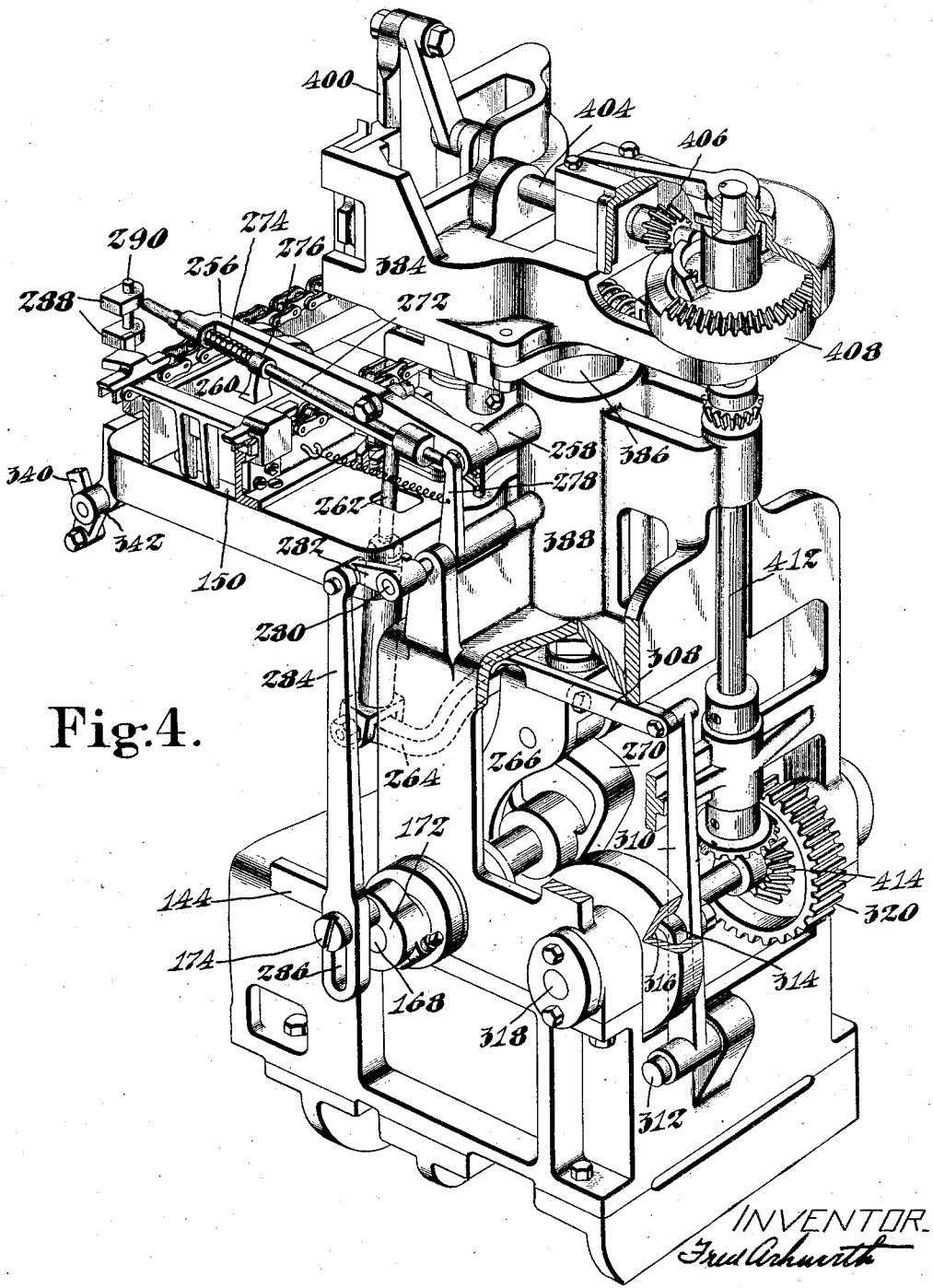

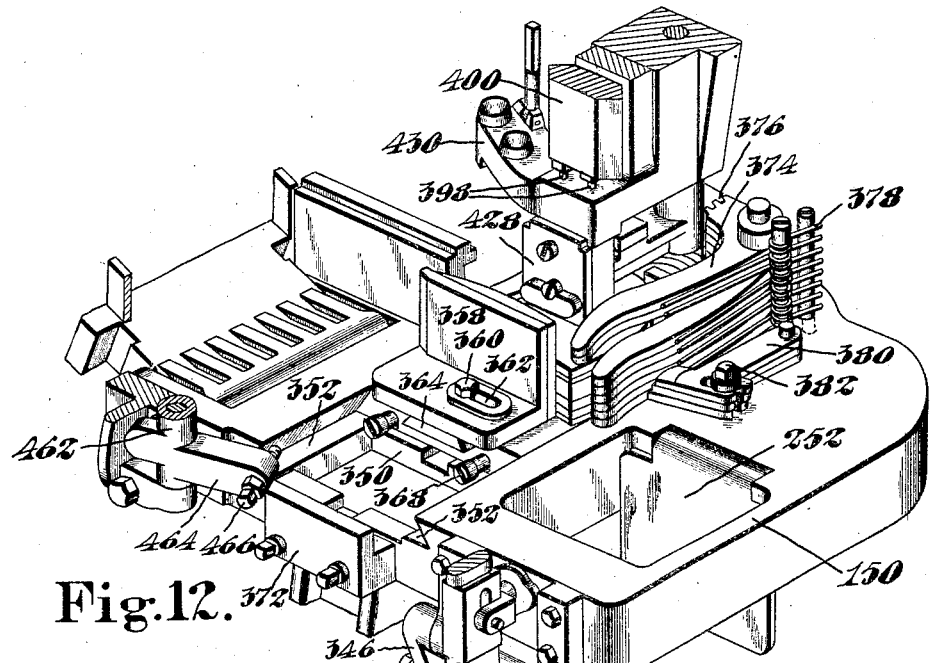
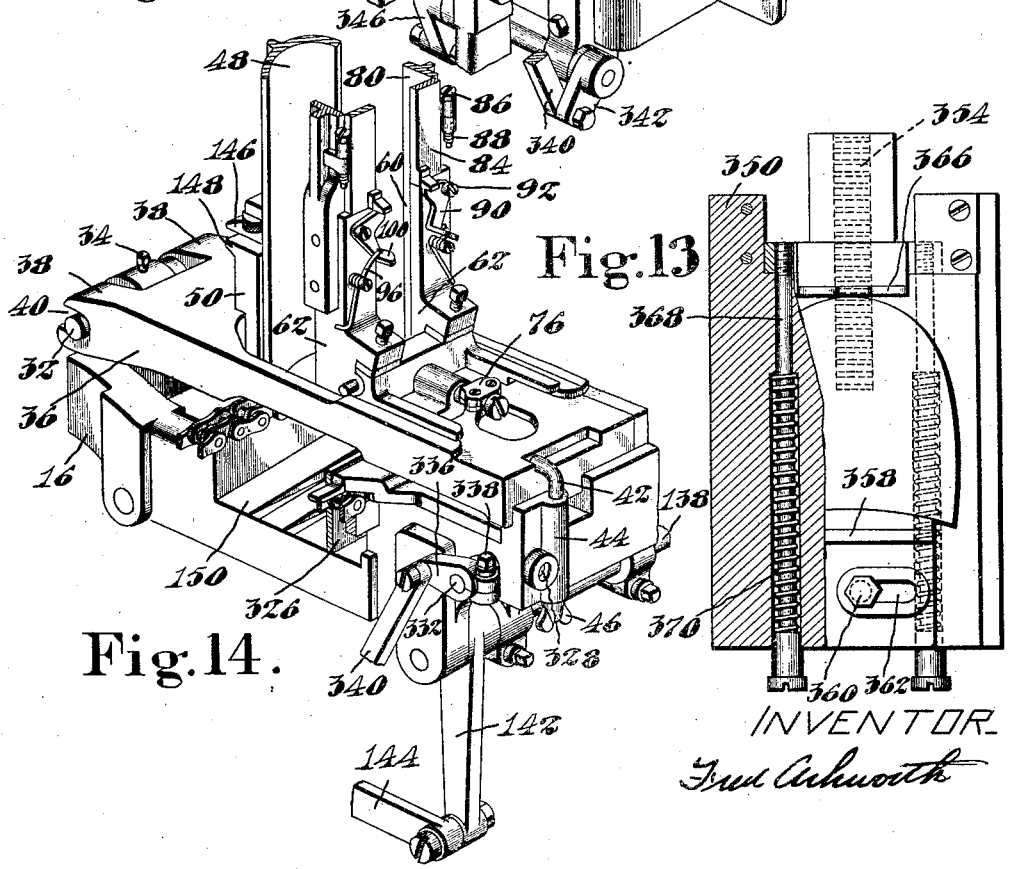

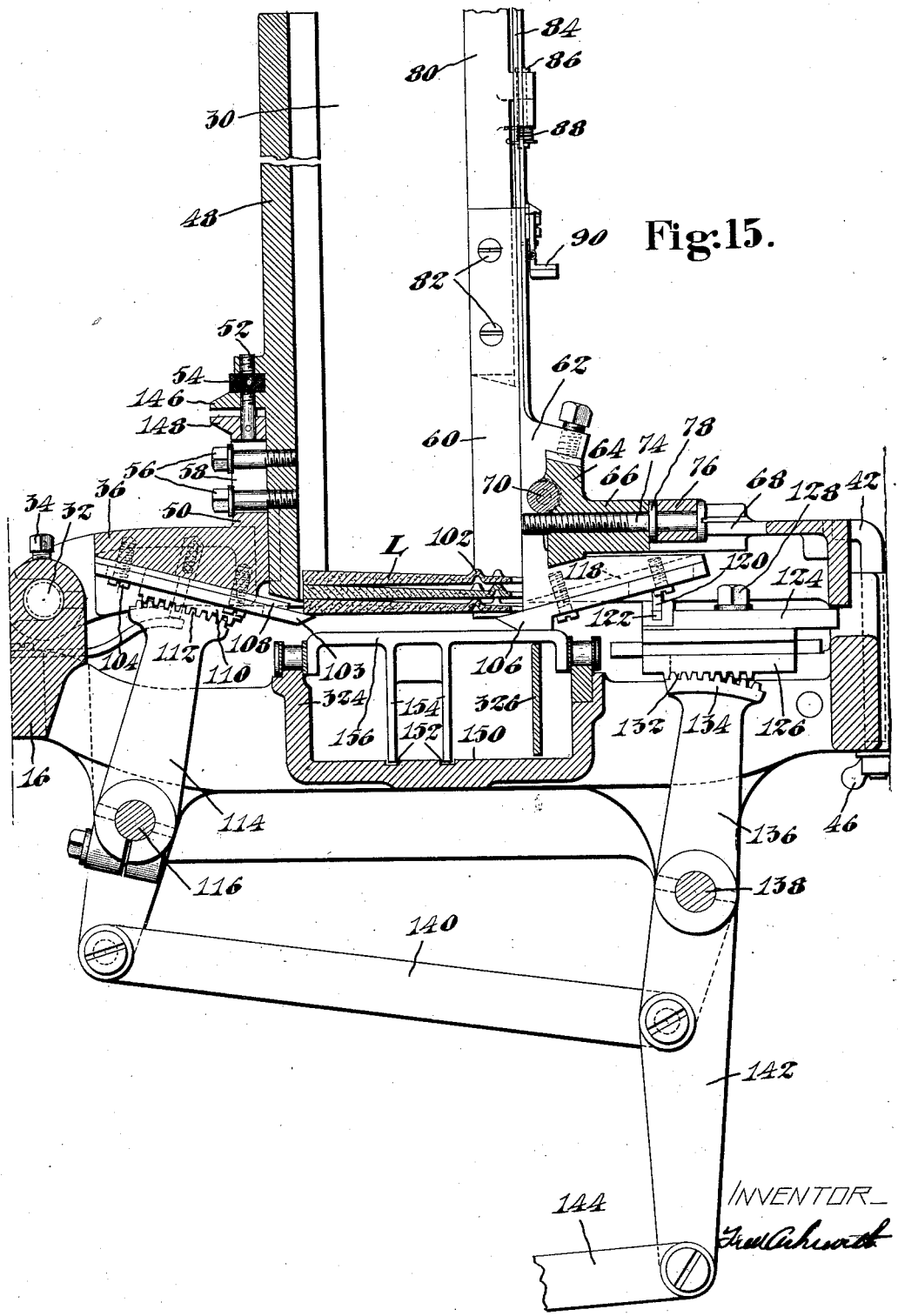

INVENTOR
Fred Ashworth

June 2, 1931. F. ASHWORTH 1,807,818
HEEL MAKING MACHINE
Filed Feb. 20, 1922 8 Sheets-Sheet 8

INVENTOR
Fred Ashworth

Patented June 2, 1931

1,807,818

UNITED STATES PATENT OFFICE

FRED ASHWORTH, OF WENHAM, MASSACHUSETTS, ASSIGNOR TO UNITED SHOE MACHINERY CORPORATION, OF PATERSON, NEW JERSEY, A CORPORATION OF NEW JERSEY

HEEL MAKING MACHINE

Application filed February 20, 1922. Serial No. 537,946.

This invention relates to heel making machines and is particularly applicable to machines of the automatic type wherein lifts are assembled and heel blanks produced mechanically.

The object of the invention is to produce a machine of the character indicated which shall be capable of manufacturing heels in quantity at a rapid rate with a minimum of skill and attention on the part of the operative, and, consequently, at a minimum labor cost. To this end improved mechanism is provided for performing the various heel manufacturing operations entirely automatically with great accuracy, whereby a product of high quality and uniformity is assured. It should be understood, however, that many of the features of the invention are useful in other than wholly automatic machines and that, in this sense, the invention is not limited exclusively to a completely automatic machine.

In the illustrated embodiment of the invention, a series of lift magazines is provided for containing the lifts or sections which are to be assembled to form the heel, and the principal duty of the operative is to keep these magazines supplied with material. The operations of assembling the lifts, nailing them together and molding the heel blank are carried out automatically without attention from the operative under normal conditions.

The illustrated machine comprises a power operated lift assembling collector of the endless chain type, and one important feature of the invention consists in arranging devices for delivering lifts to the collector under the control of the collector itself whereby proper and accurate co-operation and certainty of performance are insured.

In machines of the present type the heel piles are fed for a considerable distance along a support before the lifts are secured together and a further feature of the invention resides in the provision of side guides arranged for relative movement to secure and maintain proper alinement of the lifts as the heel pile is advanced by the feeding mechanism. More specifically, relative approaching movement of the side guides is effected during the pauses in the intermittent movement of the feeding mechanism to the end that the lifts in the heel pile shall be kept under perfect control until they are secured together.

Another feature of the invention relates to an improved co-operating organization of blank feeding means and blank nailing means at one side of the path thereof in combination with means for transferring a blank from the path of the feeding means to the nailer, and returning it after it has been nailed. An associated feature of improvement includes the provision of mechanism for locking the feeding means against operative movement while the blank is out of its path.

In accordance with the principle of relieving the operative of the necessity for continual watchfulness, measuring mechanism has been provided for measuring a pile of assembled lifts before it is nailed and discharging it from the machine if the assembly is incorrect or if the pile, for any reason, does not conform to a predetermined standard of height. By arranging this feature to operate upon the heel pile prior to the nailing operation the lifts are discharged in an undamaged condition and may be reassorted and used again.

In another aspect of the invention an organized machine is provided including heel molding mechanism and lift assembling mechanism controlled in its operation by the molding mechanism. Accurate and certain co-operation is thus assured in a simple way and any possibility of derangement of the unified action of the machine by failure of the molding mechanism to act correctly is guarded against with certainty. With a similar object in view, the nailing device is preferably controlled in its operation by the molding mechanism, and correct co-operation of the various elements operating upon the blank is assured.

Many other features of value and importance will be realized and understood from reading the following detailed description of one successful, practical embodiment of the invention in connection with the accompanying drawings, in which Figure 1 is a front elevation view illustrating the organization of the entire machine;

Fig. 2 is a cross section through the part of the machine where the heel building nail is driven;

Fig. 3 illustrates a detail of the locking device for the lift collecting carrier;

Fig. 4 is a perspective view from the rear of the machine showing the heel pile measuring mechanism and the driving mechanism for the nailer;

Fig. 5 is a cross section of the part of the machine where the heel pile is measured;

Fig. 6 is a view similar to a portion of Fig. 5 showing the parts in a different position;

Figs. 7, 8, 9, 10 and 11 are fragmentary views showing details of the nailer;

Fig. 12 is a perspective view showing the lift alining jaws and the slide for transferring the heel from the collector to the nailer;

Fig. 13 is a plan view partly in section illustrating details of the said slide;

Fig. 14 is a perspective view showing the lower portion of one of the lift magazines and its mounting;

Fig. 15 is a transverse vertical section through a lift magazine, showing also the lift delivering mechanism;

Figure 1:
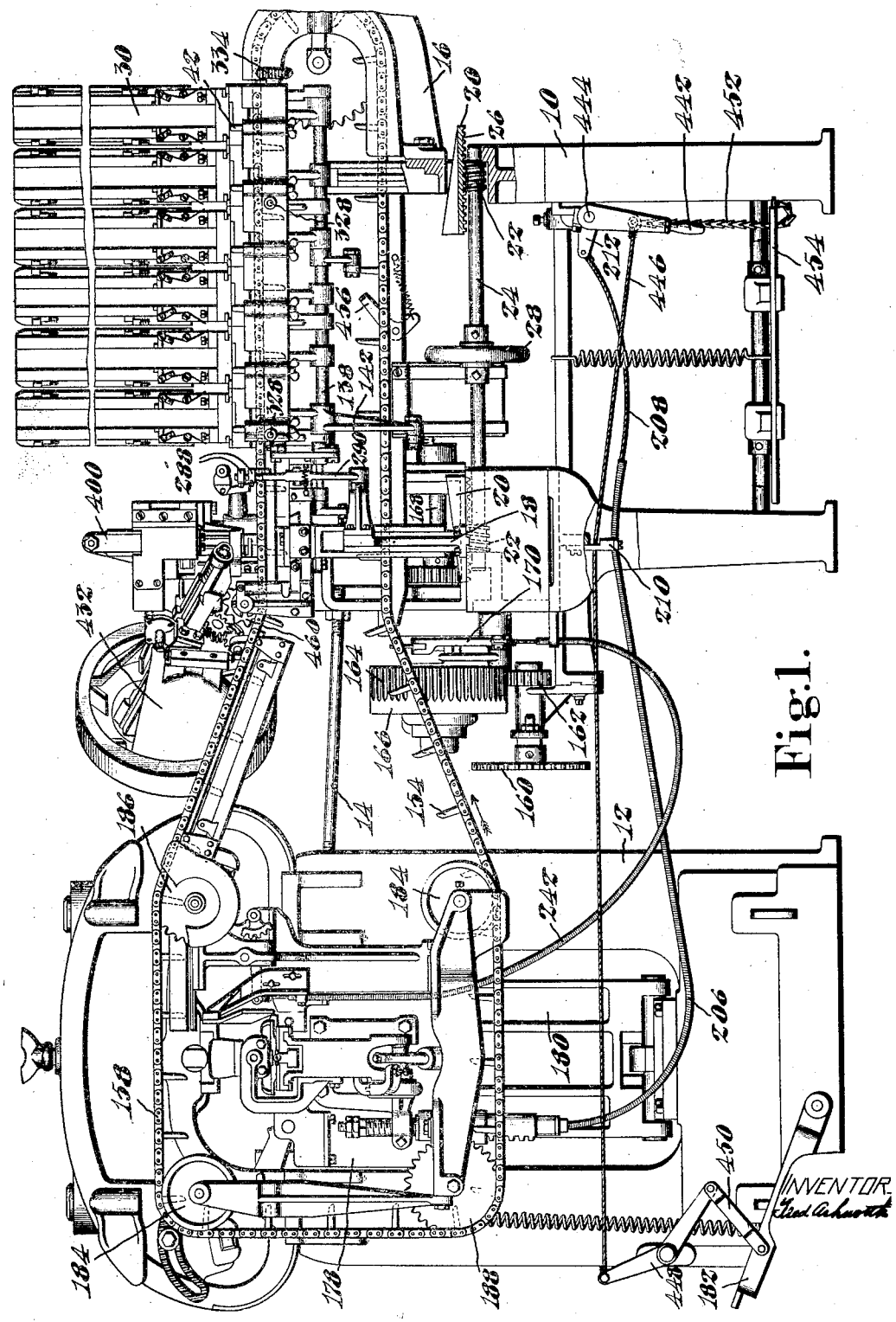

Referring now to the drawings, 10 and 12 indicate base members secured in rigid relation to each other by a brace 14 and serving to support the operating mechanism of the machine. A superstructure 16 is mounted for up and down adjustment in stationary, vertical guides 18 bolted to the base 10, adjusting wedges 20 being interposed between the base and super-structure. Two oppositely disposed worms 22 upon the ends of a worm shaft 24 mesh with teeth 26 formed on the lower sides of the wedges 20. A hand wheel 28 is secured to the worm shaft 24, and by manipulation of this hand wheel the entire superstructure 16 may be raised or lowered for the purpose of adjusting it with relation to the nailer, which will be described hereinafter, in accordance with the height of the heel being built. The nailing mechanism is, in each cycle of operation, lowered and raised through a fixed distance and path, and is not carried by, nor adjusted with, the superstructure 16.

The superstructure 16 serves as a support for a series of lift magazines 30 and for portions of the lift collecting and heel pile transferring mechanisms which will be described in detail later. The number of lift magazines may be selected as desired, it being understood that there will be as many magazines as there are lifts in the heel to be built. In the illustrated embodiment of the invention six such magazines are shown but it will be understood that this number can be increased indefinitely, according to the requirements of work to be done.

Inasmuch as the magazines are duplicates of each other it will be sufficient to describe one of them in detail. Referring particularly to Figs. 1, 14 and 15, 32 indicates a stationary shaft secured in the superstructure member 16 by a set screw 34. The shaft 32 serves as a pivot about which a magazine supporting member 36 may swing vertically. Arms 38 which extend rearwardly from the member 36 are bifurcated, as shown at 40, whereby the member 36 and the magazine carried thereby may not only swing about the shaft 32 as a pivot but may readily be removed bodily from the machine.

It will be understood that the magazine supporting member 36 is positioned by the shaft 32 while the front end of the said member, which rests upon a suitably formed surface on the superstructure 16, as clearly shown in Fig. 14, is held down in operative position by a clamping bolt 42 which passes through a boss 44 on the superstructure 16 and has, at its lower end, a thumb nut 46 by which it may be tightened. The lift magazine, which is indicated generally by the reference character 30, comprises members for engaging the rear end and breast corners of the lifts. The rear end engaging member 48 is curved to approximately the shape of the rear end of a heel lift. The member 48 is adjustably secured to an upright bracket 50 upon the supporting member 36. A threaded pin 52 is secured at its lower end in the bracket 50, and a nut 54 which is threaded upon the pin and contained in a recess in the magazine member 48 serves to effect vertical adjustment of said member with respect to the bracket 50. Clamping bolts 56 passing through a slot 58 in the bracket 50 and threaded into the magazine section 48 serves to secure the magazine section in adjusted position.

The members 60 for engaging the breast corners of the lifts are angular in shape and are carried by supports 62 which are gibbed upon a dovetail 64 formed upon a slide 66 supported in guides 68 formed in the member 36.

The two supports 62 are connected by a right and left screw 70. By turning this screw the breast corner engaging members of the magazine can be adjusted toward or from each other to conform to the width of the lifts to be handled.

Inasmuch as the rear member 48 is horizontally stationary, it is necessary to provide, in addition to the width adjustment just described, means for adjusting the size of the magazine to the length of the lifts. To this end a screw 74 is mounted for rotation in a stationary bearing 76 formed in the member 36 but is restrained from endwise movement in said bearing by a collar 78. The screw 74 is threaded into the slide 66 and rotation of the screw will, therefore, effect forward and rearward adjustment of the magazine members 60 whose location is determined by the position of the slide 66.

Plates 80 are secured to the sides of the angular members 60 by screws 82 and extend upwardly to the top of the magazine. Swinging doors 84 are hinged at 86 to the plates 80 and torsion springs 88 surrounding the hinge pins tend to cause the doors 84 to swing open unless restrained. The angular members 60 are only of sufficient length to retain a supply of lifts for the feeding mechanism while a fresh stock of lifts is being placed in the upper portion of the magazine and, it is for the purpose of facilitating the replenishment of the lifts in the magazine that the doors 84 are constructed to be opened. In order to keep the doors 84 closed to retain the stock of lifts in the magazine, latches 90 are provided. The latches 90 swing about pivot screws 92 and are so formed that when their lower ends are drawn toward each other by springs 96, the upper ends of the latches are in front of the respective doors, restraining the latter from opening under the influence of the springs 88. Each latch has, at its lower end, a forwardly projecting finger piece 100 by means of which it may be turned about its pivot to allow the corresponding door 84 to fly open. When it is desired to introduce a supply of lifts into the magazine, the latches 90 are turned until the doors 84 are opened by the springs 88, whereupon the lifts are readily introduced through the open front of the magazine. When the magazine is filled the doors are closed manually, the latches snapping up in front of them to secure them.

In Fig. 15 a series of lifts L are shown in the bottom part of the magazine. In this instance wedge lifts are illustrated but it will be understood that most of the magazines contain ordinary lifts. The magazine, however, is adapted to handle equally well either wedge lifts or plain lifts. The wedge lifts L, as shown, are formed with protuberances 102 to facilitate stacking them in a straight stack. This lift and the method of stacking are not herein claimed but are claimed in a copending application of the present inventor, Serial No. 284,058 filed March 21, 1919 now Patent Number 1,575,610, dated Mar. 9, 1926.

Mechanism for delivering the lifts from the magazine one at a time will now be described. In the illustrated machine the stack of lifts is supported at three points and the lowermost lift is delivered from the stack at each operation of the machine. The action of the delivering mechanism will be described with reference to the lift at the bottom of the stack. The rear end of the lift rests upon a stationary, inclined finger 103 which is adjustably secured to the magazine supporting member 36 by screws 104 passing through slots in the finger. The front edge of the lift rests upon a pair of inclined supporting fingers 106 located near the breast corners of the magazine and secured to the upright member 62 by screws. A pusher 108 is slidably mounted upon the upper face of the lift supporting member 103 and has secured to it a depending rack 110 which meshes with the gear segment 112 upon the upper end of a lever 114 movable about a stationary pivot 116. Oscillation of the lever 114 will thus be translated into reciprocating motion of the pusher 108.

A similar pusher 118 is mounted to slide upon the upper surfaces of the lift supports 106 and has a downwardly projecting lug 120 which enters a slot 122 in a plate 124 adjustably secured to a horizontal slide 126 by a bolt 128. The slide 126 is provided with a rack 132 similar to the rack 110, meshing with a gear segment 134 upon the upper end of a lever 136 mounted upon a rock shaft 138. The levers 114 and 136 are connected by a link 140 and will, therefore, oscillate together when the rock shaft 138 is oscillated. The rock shaft has secured to it a rocker arm 142 to the lower end of which is pivoted a connecting rod 144 operated at appropriate times by means which will presently be described. This oscillation of the levers 114 and 136 will cause reciprocating motion of the pushers 108 and 118 simultaneously in the same direction.

In the operation of delivering lifts one at a time from the bottom of the magazine the connecting rod 144 is actuated, causing the levers 144 and 136 to oscillate and the pushers to reciprocate. As the pusher 108 advances toward the right, as seen in Fig. 15, it engages and pushes the lower lift L toward the right, the thin edge of the lift sliding upwardly along the supporting fingers 106 until the thick edge of the lift drops off the finger 103. While the pusher 108 is advancing, the pusher 118 is being retracted. After the thick end of the lift has dropped from the finger 103 the direction of movement of the pushers is reversed, the pusher 118 moving the lift L to the left until its thin edge drops off the supporting fingers 106. This operation is repeated as often as it is desired to deliver a lift from the magazine.

Caliper jaws 146 and 148 are formed respectively upon the magazine section 48 and its supporting bracket 50, and the design is such that when the caliper jaws are set upon a lift the space between the bottom edge of the magazine section 48 and the upper surface of the finger 103 is correct for delivering that lift from the magazine. In adjusting the height of this magazine section a lift is placed between the jaws 146 and 148 and the height of the magazine section is adjusted accordingly by means of the nut 54. Beneath the magazines the superstructure 16 is formed with a flat heel pile supporting surface 150 containing parallel grooves 152 in which travel the lower ends of pairs of lift assembling and feeding fingers 154 carried by cross bars 156 connected at equally spaced intervals into an endless chain lift collector 158. The spacing of the pairs of fingers 154 is the same as the spacing between adjacent magazines and the collector chain 158 is moved step by step, in the direction indicated by the arrow in Fig. 1, through distances equal to the spacing between adjacent pairs of fingers.

The mechanism for operating the lift delivering devices will now be described. Referring to Figs. 1, 2 and 4, 160 indicates a sprocket which may be driven from any suitable source of power and which has rigidly secured to it a pinion 162 meshing with gear teeth 164 cut in the periphery of the fly wheel 166. The fly wheel 166 is freely rotatable upon a driving shaft 168 and may be connected thereto and disconnected therefrom at will by a one-revolution clutch which is indicated at 170.

Upon the end of the shaft 168 opposite the fly wheel 166 is secured a crank member 172 provided with a crank pin 174 by which the rear end of the connecting rod 144 is reciprocated forwardly and rearwardly of the machine. It will be apparent that a single revolution of the shaft 168, which results from engaging the clutch 170, will cause a complete stroke of the connecting rod 144 first in one direction and then in the other and, through the lift delivering devices already described in detail, the lowermost lift in each magazine will be delivered or dropped upon the support 150.

Figure 17:
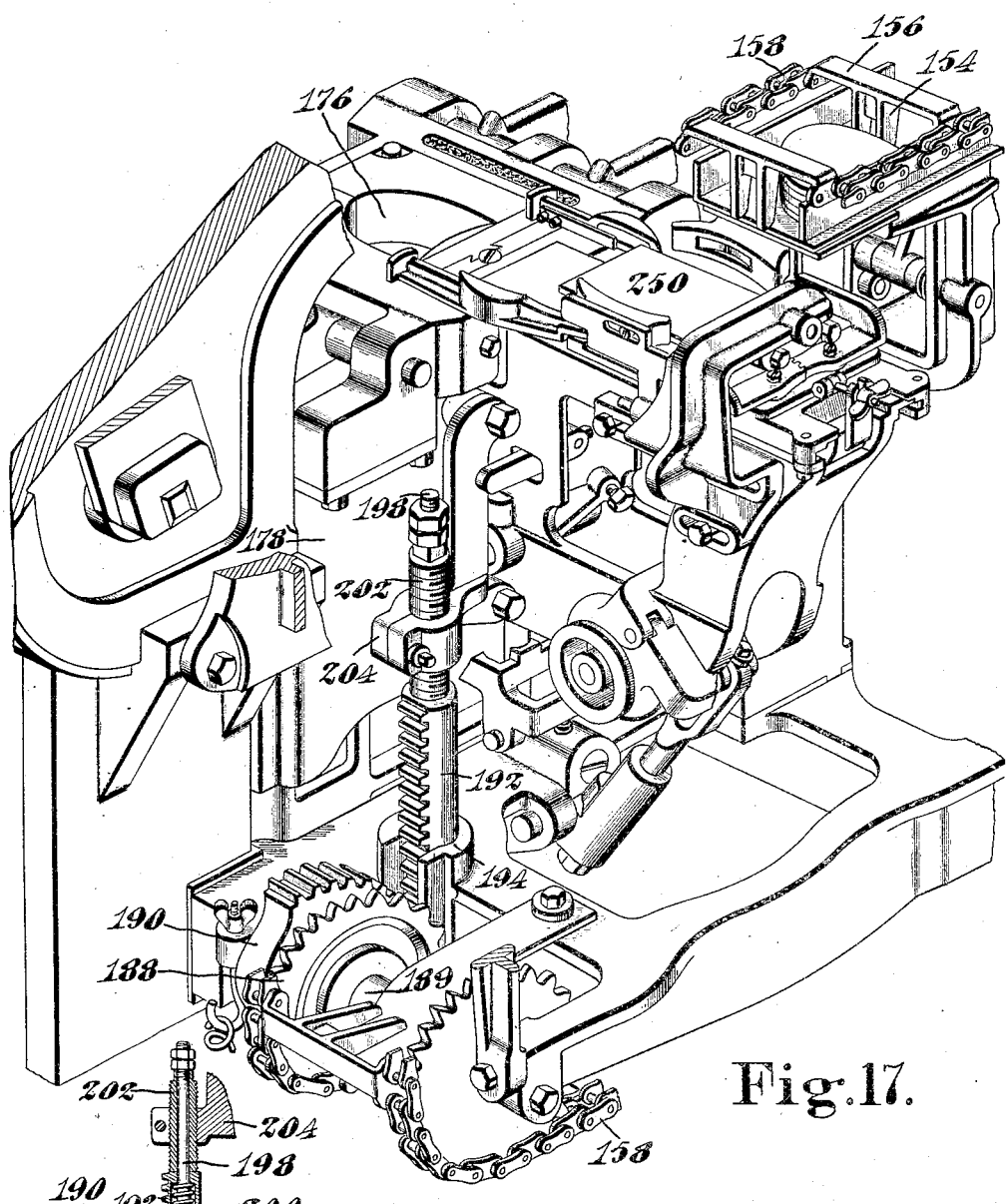
Fig. 17 is a perspective view of the actuating mechanism for the lift collector and the compressing means for the heel.
Figure 18:
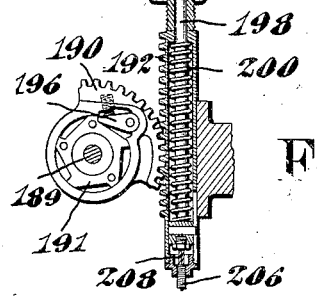
Fig. 18 is a vertical section of a detail of the collector actuating mechanism.

After each lift delivery the collector 158 is advanced one step, as previously stated, through a distance equal to the spacing between adjacent magazines. The mechanism for actuating the endless chain collector will now be described. Referring particularly to Figs. 1, 17 and 18, 176 indicates a heel compressing mold carried upon a vertically reciprocating cross head 178. The cross head 178 may be reciprocated continually by a suitable mechanism, including a toggle 180 which is power driven and controlled by a foot treadle 182. The collector chain 158 passes around two idle pulleys 184, an idle sprocket 186, and a driving sprocket 188, all of which are journaled in bearings supported by the stationary frame member 12. The mechanism for actuating the driving sprocket 188 is best illustrated in Figs. 1, 17 and 18, where the sprocket 188 is shown as mounted upon a shaft 189 which has secured to it a ratchet 191. Loosely journaled upon the shaft 189 is also a hollow segmental gear 190 which meshes with a rack 192 mounted for vertical reciprocation in a stationary bearing 194. In the interior of the hollow gear 190 is pivoted a pawl 196 which engages the teeth of the ratchet 191. By virtue of this construction one complete reciprocation of the rack 192 will cause the driving sprocket 188 to rotate through an angle equal to that between adjacent teeth of the ratchet 191, and the mechanism is so designed that this will cause the collector chain 158 and the fingers 154 carried thereby to move the distance between two successive lift magazines. In other words, as long as the rack 192 continues to reciprocate the desired step by step feeding movement of the collector will occur.

In order to reciprocate the rack 192 it is connected by means of a plunger 198 and a yieldable compression spring 200 to a screw threaded member 202 which is vertically adjustable in a bracket 204 carried by the reciprocating head 178. The spring 200 is of sufficient strength and is sufficiently compressed so that it does not yield in the normal operation of the machine and the rack, therefore, reciprocates with the head 178. In case, however, the collecting fingers, or any part of the collector chain, should encounter undue resistance to its feeding movement the spring 200 will yield, and breakage of the mechanism will be avoided.

In the event that the collector encounters an obstruction, it is desirable that the machine be stopped automatically and remain stopped until the obstruction is removed. To this end, the relative movement between the plunger 198 and the rack member 192 incident to the yielding of the spring 200 is utilized to disconnect the power from the machine. A flexible conduit 206 is secured at one end to the rack member 192, the other end of the conduit being supported by a stationary holder 210. Passing through the conduit is a flexible cable 208, one end of which is secured to the lower end of the plunger 198 and the other end of which is attached to an arm 212 (see Fig. 1) which in turn is connected to the treadle 182 by means which will later be described in detail. It is sufficient at this point to state that pulling the cable 208 through the conduit 206 causes the treadle 182 to be operated to disconnect the driving power from the machine. It will thus be seen that any interference with the feeding movement of the collector chain 158 will immediately and automatically stop the machine.

Figure 20:
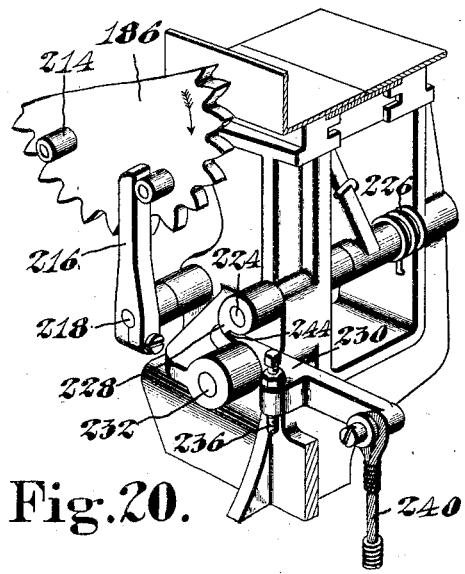
Figs. 19, 20 and 21 show details of the mechanism for controlling the operation of the nailer.
Figure 21:
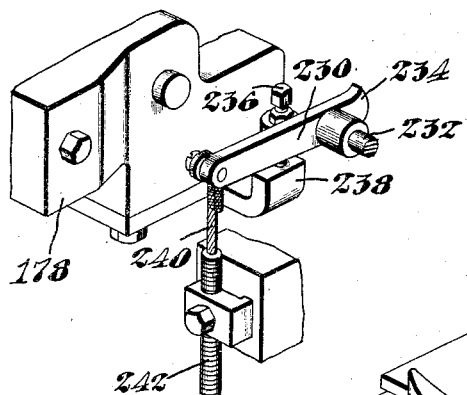

The mechanism is so timed that the pauses in the intermittent movement of the collector 158 always occur when the fingers 154 are between the magazines 30. At this period the collector fingers are in the proper position for the delivery of lifts from the magazines and, in order to perform this operation automatically, the actuation of the lift delivering means is controlled directly by the collector chain 158 and, inasmuch as the collector chain is driven by the heel compressing mechanism and operates in fixed time relation thereto, the lift delivering devices are also controlled by the compressing mechanism. To this end, referring now to Figs. 19, 20 and 21, a series of pins or rolls 214 are mounted on the rear face of the idle sprocket 186 with which the chain 158 meshes. The spacing between the rolls 214 is such that the roll is advanced through a distance equal to such spacing at each step in the movement of the chain. A lever 216 secured to a shaft 218 is so located in the path of the rolls 214 that the lever is swung each time a roll passes it. A gear segment 220 secured to the shaft 218 meshes with a similar gear segment 222 secured to a shaft 224. A torsion spring 226 surrounding the shaft 224 operates to swing the lever 216 in a direction to engage the rolls 214. A cam 228 is secured to the end of the shaft 224 and turns with it. A cam lever 230, co-operating with the cam 228, is mounted to turn about a stationary pivot 232. The nose 234 of the cam lever engages the cam 228 and an adjustable screw 236 threaded through the cam lever is arranged to be engaged by a lug 238 secured to, and moving with, the vertically moving head 178. The tail end of the cam lever 230 is connected by a cable 240, passing through a flexible conduit 242 to the clutch 170 which controls the applicaiton of power to the lift delivering devices.

The operation of the mechanism just described is as follows: The upward movement of the mold carrying head 178, acting through the rack 192 and gear 190, causes the collector chain 158 to be advanced one step. The movement of the chain effects rotation of the sprocket 186 and causes one of the rolls 214 to engage and swing the lever 216. This causes the cam 228 to be swung in the direction to actuate the cam lever 230 and pull upon the cable 240, engaging the clutch 170 and causing the lift delivering devices to operate to deliver a single lift from the bottom of each magazine.

Figure 19:
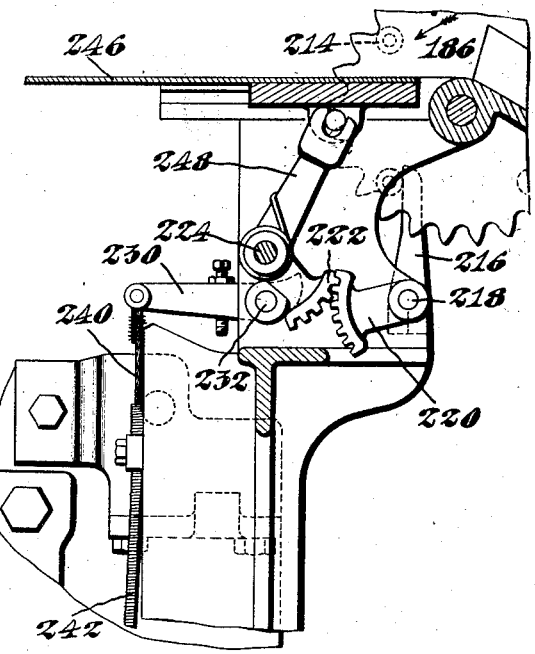
Figure 22:
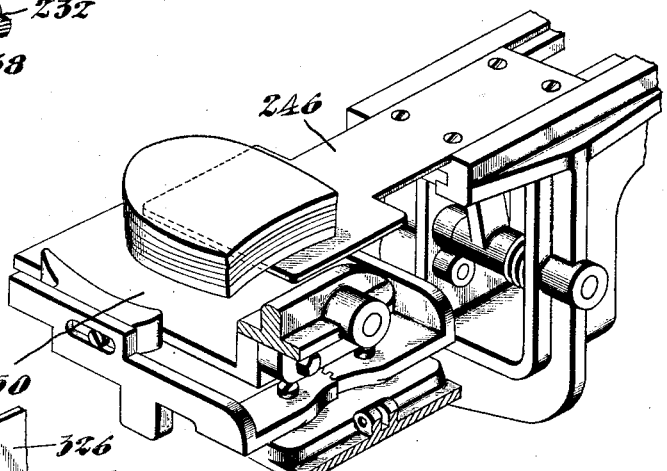
Fig. 22 shows the detail of the mechanism for transferring the heel from the collector to the compressing means.

The cam 228 also has a shoulder 244 behind which the nose 234 of the cam lever engages when the cam is swung to its limit. This, for the time being, locks the shaft 224 against returning to its initial position under the tension of the spring 226 when the lever 216 drops off the roll 214. The purpose of this will now be explained. In Figs. 19 and 22, 246 indicates a sliding plate upon which a heel blank is fed by the collector chain at each step in the movement of the latter. This sliding plate is connected to a rocker arm 248 secured to the shaft 224 and oscillation of the shaft thus causes reciprocating movement of the blade. When the shaft 224 is locked by the engagement of the nose 234 behind the shoulder 244 the plate 246 is projected into the position shown in Fig. 22 wherein the heel blank is over the mechanism which feeds the blank into the compressing mold 176. The said mechanism is in blank receiving position when the cross head 178 reaches the top of its stroke and, consequently, at this time, the lug 238 engages the stop screw 236, rocking the cam lever 230 until the shaft 224 is unlocked and the spring 226 is permitted to snap the plate 246 suddenly out from under the heel blank, allowing the latter to drop readily into feeding position in the space 250 beneath the blank. By thus withdrawing the supporting plate 246 suddenly the blank drops the short distance it has to fall without tipping or becoming disarranged.

It will be understood that, as is usual with step by step automatic lift assemblers, when each pair of collector fingers 154 has passed the row of magazines it will be feeding before it a completely assembled heel pile. The illustrated machine is arranged to build socalled "dry" heels, that is, heels in which paste is not used to secure the lifts together. Accordingly, provision is made for driving one or more building nails to secure the lifts together to form a heel blank. Prior to the nailing operation, however, it is desirable to ascertain whether or not the assembly of lifts in the heel pile is perfect and to avoid the nailing of any piles which may lack a lift, have an extra lift, or be imperfect in height for any reasons. Mechanism is provided for performing a measuring operation upon each heel pile prior to the nailing operation and discharging the unnailed pile of lifts from the machine if it is not correct in height. By discharging the lifts before the nail is driven it is easily possible to reassort them and use them over again, saving the labor required to pull apart a defective heel which has been nailed and also avoiding the inevitable mutilation of the lifts incident to such an operation.

The support 150, along which the heel pile is fed by the collecting fingers 154 is provided with a movable portion or trap door 252 arranged to turn upon a stationary pivot 254. The trap door 252 is so located that an assembled heel pile comes to rest upon it at each pause in the movement of the collector chain. A measuring arm 256 is pivoted at 258 to a stationary portion of the machine frame and carries a foot 260 arranged to engage the heel pile upon the trap door 252. An adjustable yielding link 262, pivoted to an intermediate point of the arm 256, is connected at its lower end to a bracket 264 bolted upon a vertically reciprocable cam roll carrier 266 containing a pair of cam rolls 268 which engage a cam 270 keyed upon the shaft 168. The timing is such that the cam roll carrier 266 descends and the foot 260 is brought down upon the heel pile at the time when the latter is at rest upon the trap door 252.

A rod 272 is mounted to slide longitudinally in bearings provided in the arm 256 and is pressed rearwardly by a compression spring 274 interposed between the forward bearing and a collar 276 upon the rod. The rear end of the rod is engaged by a rocker arm 278 upon a shaft 280, to which is secured a rocker arm 282 connected by a link 284 to the crank pin 174 by a slotted connection 286 which permits a predetermined amount of lost motion between the crank pin and the link. The timing is such that the rotation of the shaft 168 and the crank pin 174 carried thereby causes the rod 272 to be projected forwardly in its bearings at the time when the foot 260 is in engagement with the heel pile. Two independently, vertical adjustable blocks 288 are secured to the upper end of a lever 290 movable about a stationary pivot 292 and drawn rearwardly by a spring 294. The lever 290 has a pin and slot connection with a horizontally slidable latch 296 which projects under the forward edge of the trap door 252 and supports the same. The blocks 288 are so adjusted that when the foot 260 is in engagement with a heel pile of correct height the rod 272, when projected forwardly, will pass between the blocks, as shown in Fig. 5, and nothing will occur. If, however, the heel pile is not of correct height, the rod 272 will engage one or the other of the blocks 288. For example, if the heel pile lacks a lift, as shown in Fig. 6, the rod will engage the lower block and, when the rod is projected, the lever 290 will be swung to the left and the latch 296 will be withdrawn, allowing the trap door 252 to fall and the imperfect heel pile to be discharged from the machine, as shown at A.

The trap door has secured to it a depending tail 298 co-operating with a pin 300 to restore the trap door after an imperfect heel pile has been discharged. The pin 300 is mounted in the end of an arm 302 secured to a shaft 304 to which is also secured an arm 306 connected by a link 308 to a cam lever 310 movable about a stationary pivot 312 and carrying a cam roll 314 engaging a cam 316 upon a counter shaft 318 geared by gears 320, 322 to the driving shaft 168. Referring to Figs. 4, 5 and 6, it will readily be understood that the operation of the cam lever 310 will cause the pin 300 to be moved into engagement with the tail member 298 to restore the trap door 252 to the position shown in Fig. 5.

Figure 16:
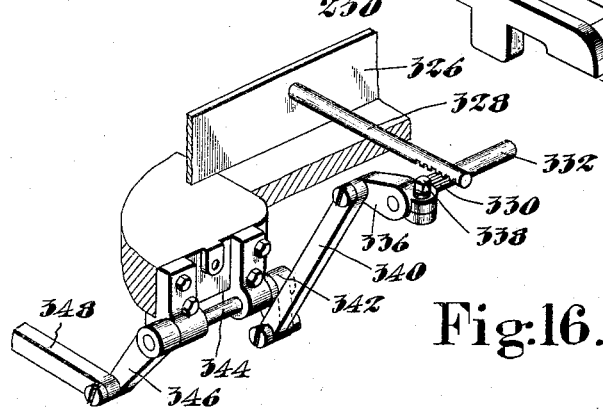
Fig. 16 shows a detail of the side guide operating mechanism.

Inasmuch as the rear members 48 of the magazines are stationary horizontally and only the breast engaging portions 60 of the magazines are adjusted for different sizes of lifts, it is desirable that adjustment of the trough-like space beneath the magazines, and along which the heel piles are fed, should be made at the front side. Accordingly, the rear heel pile guiding wall 324 is stationary and the opposite guiding member consists of a plate 326 which is adjustable toward and from the stationary wall 324. The plate 326 is carried by a pair of parallel sliding rods 328 having rack teeth cut in their lower sides, as shown in Fig. 16. These rack teeth mesh with pinion teeth 330 cut in a rotatable rod 332, to the right hand end of which is secured a hand wheel 334 for performing the adjustment manually. A split clamping arm 336 is releasably secured to the rod 332 by a clamping screw 338 which is loosened when it is desired to adjust the plate 326 for different sizes of lifts. After the adjustment is made the clamping screw 338 is tightened and the plate 326 is given a regular reciprocating movement within predetermined limits transversely of the feed trough by mechanism which will now be described.

The clamping arm 336 is connected by a link 340 to an arm 342 upon a rock shaft 344 to which is also secured an arm 346 connected by a link 348 to the arm 306 on the shaft 304. Each time the shaft 304 is rocked, therefore, the adjusting rod 332 is also rocked and the plate 326 is moved transversely of the heel pile support. The object in doing this is to maintain the lifts in the heel pile in alinement, insuring that they shall remain under control and shall enter properly the positioning jaws of the nailer. This alining operation is timed to occur during periods of rest of the heel piles and, consequently, does not interfere with the feeding of the piles.

The nailing device will now be described. In the next step of movement of the collector chain after the heel pile has been measured the pile is fed to a position where it stops upon a transverse slide or transferrer 350. This slide is movable transversely of the path of the collector in guides 352 and has a rack 354 formed on its under side. The rack 354 meshes with a toothed segment 356 secured to the shaft 304 and oscillated thereby. A breast gage 358 is mounted upon the slide 350, and adjustment of the breast gage, both transversely and longitudinally of the slide, is provided for by a bolt 360 which passes through a slot 362 in the base of the breast gage and is threaded into a dovetail plate 364 which is freely movable in dovetail guides longitudinally of the slide 350 when the bolt 360 is loosened. When the bolt is tightened the breast gage is secured in adjusted position upon the slide 350. A back gage 366 is mounted upon a pair of rods 368 arranged to slide freely in the slide 350 and surrounded by compression springs 370 which tend to draw the back gage toward the breast gage but permit the back gage to yield away from the breast gage under certain conditions.

When the slide 350 is moved forward the front ends of the rods 368 engage a stationary stop member 372, causing the springs 370 to yield and the separation between the breast gage and back gage to be increased sufficiently to permit the oncoming heel pile to enter freely between them. After the heel pile has been fed into position between the gages 358, 366 and the collector has paused with the heel pile upon the slide 350, the shaft 304 is rocked and the slide, with the heel pile upon it, is drawn rearwardly, transferring the heel pile out of the path of the collector fingers and introducing it into the lift alining jaws of the nailer. These jaws, shown at 374, consist of a series of superposed, thin fingers, geared together in pairs at 376 for equal and opposite movement. Individual springs 378 tend always to move the fingers toward each other, but permit them to yield outwardly when the heel pile is introduced between them. Individually adjustable stop members 380, secured in adjusted position by a clamping bolt 382, are provided to limit the outward movement of the fingers 374 and thus provide a more positive transverse alinement of the lifts in the heel pile prior to the driving of the nail.

The nailer head 384 is mounted upon a vertical plunger 386 located in a vertical guide 388 formed in the frame of the machine. The plunger 386 is hollow, as best shown in Fig. 2, and contains a rod 390 surrounded by a stiff compression spring 392. The spring is kept under compression by a nut 394 having a splined connection with the bore of the plunger 386 and into which the upper end of the rod 390 is threaded. Below the lower end of the plunger 386 the rod 390 has a capstan head 396 to provide for adjustment of the tension of the spring 392. The rod 390 is secured to the cam roll carrier 266 which is reciprocated vertically by the cam 270. It will be seen that when the cam roll carrier 266 descends, the arm 264 will operate the measuring device to measure one heel pile and the nailer head will, at the same time, descend to operate upon a previously measured heel pile which is now between the centering and alining fingers 374. The nail driver or drivers 398, two being shown in the present instance, are carried by a driver slide 400 which is operated from a crank 402 upon a shaft 404 upon which is a pinion 406 driven by a mutilated gear 408 splined at 410 to an upright shaft 412 driven by bevel gears 414 from the counter shaft 318. The splined connection permits up and down movement of the driver head without vertical movement of the shaft 412.

The under side of the gear 408 carries a cam 416 which actuates, through the medium of a cam roll 418 and cam lever 420, a yielding link 422 pivoted to an arm 424 secured to the upper end of an upright shaft 426. The lower end of the shaft 426 carries a swinging nail nozzle 428 which, by the oscillation of the shaft 426, is swung between nail receiving position and nail driving position. In nail receiving position the nozzle member 428 receives nails from the delivery foot 430, see Fig. 8, of an automatic nail feeder 432 which need not be described in detail herein. The delivery of nails from the nail feeder is controlled by a lever 433 having at its lower end a cam roll 434 actuated by a cam 436 upon the arm which carries the nozzle member 428. Within the nozzle 428 are spring pressed nail centering fingers 438 which hold the nails while the nozzle member is swung from nail receiving position to a nail driving position in alinement with the drivers 398. The nail feeder 432 is operated by a bevel gear 440 secured to the upright shaft 412.

After the heel building nails have been driven and the nailer head raised to release the heel, the slide 350 returns the nailed heel blank to the path of the collector fingers 154, whereupon the collector chain makes the next step in its intermittent movement, removing the nailed blank from the slide 350 and feeding the next heel pile from measuring position to a position upon the slide.

In order to provide manual, as well as automatic, control of the machine a handle 442 is pivotally mounted upon the machine base 10 at 444. The handle 442 is connected by a cable 446 to a lever 448 which, in turn is connected by a link 450 to the clutch controlling treadle 182. When it is desired to start the machine the handle 442 is thrown upwardly, toward the right, as seen in Fig. 1, drawing upon the cable 446 and depressing the treadle 182 to start the machine. In the running position of the machine the handle is somewhat above a horizontal position, where it will remain. This movement of the handle takes up the slack in a chain 452 which connects the handle to a treadle 454 which is provided for the purpose of permitting the operator to stop the machine quickly without reaching for the handle. The handle is rigidly connected also to the arm 212 to the end that the machine may be stopped automatically when the cable 208 is pulled. As shown in Fig. 1, the cable 208 is slack when the handle 442 is in the position in which the machine is stopped. Inasmuch as the spring 200 is always under tension, it will be apparent that the normal operating relation between the plunger 198 and the rack member 192 will be restored automatically by the spring as soon as the cable 208 is slackened.

The yielding connection is, therefore, self restoring.

A spring actuated dog 456 engages between the collector finger carrying cross bars 156 to prevent accidental reverse movement of the collector chain and, at the time when the transferrer 350 is out of alinement with the path of the collector, the chain is locked by a spring-actuated lug 458, see Fig. 3, entering a notch on the idle sprocket 460 with which the collector chain meshes. The lug 458 is formed upon the upper end of a rocker member 462 at the lower end of which is an arm 464. A screw 466 is threaded adjustably into the end of the arm 464 and is arranged to be engaged by the slide 350 when the latter is returned to a position in which the heel blank thereon is in the path of the collector fingers. This engagement of the screw 466 by the slide 350 turns the rocker member 462, unlocking the collector chain and permitting its feeding movement to proceed.

Having described the invention, what is claimed as new and desired to be secured by Letters Patent is:—

1. A heel building machine comprising an endless chain lift collector, means for delivering lifts to the collector, and mechanism controlled by movement of the endless chain for actuating said means to deliver lifts to the collector.

2. A heel building machine comprising an endless chain lift collector, a sprocket geared to the chain, power means for advancing the chain to collect lifts, and separate power means controlled by said sprocket for delivering lifts to the collector.

3. A heel building machine comprising an intermittently movable endless chain lift collector, power operated means for delivering lifts to the collector, and a power controller operated by the collector to apply power to the lift delivering means when the collector is at rest.

4. A heel building machine comprising an endless carrier lift collector, driving means for moving the collector step by step, a device for delivering lifts one at a time to the collector, a one-revolution clutch controlling the lift delivering device, and a clutch actuator operated by movement of the collector to cause the lift delivering device to deliver a lift to the collector at each step in the movement of the latter.

5. A heel building machine comprising an intermittently movable lift collector, a plurality of devices for delivering lifts to the collector, and power operated means controlled by movement of the collector to cause each of said devices to deliver a lift to the collector at each step of its intermittent movement.

6. In a heel machine, the combination of a smooth support, mechanism for feeding a heel pile intermittently along the support, side guides between which the heel pile moves as it is fed along the support, and means, operating in timed relation to the feeding movement of the heel pile, for effecting relative approaching movement of the side guides.

7. In a heel machine, the combination of a smooth support, mechanism for intermittently feeding a heel pile along the support, side guides between which the heel pile moves as it is fed along the support, and means, operating during periods of rest of the feeding mechanism, for effecting relative approaching movement of the side guides.

8. In a heel machine, the combination of a smooth support, mechanism for feeding a heel pile intermittently along the support, side guides between which the heel pile moves as it is fed along the support, and power operated means for effecting relative approaching and separating movement of the side guides during the periods of rest of the feeding mechanism.

9. In a heel machine, the combination of a blank magazine, an intermittently operated blank feeder, a device for delivering blanks one at a time from the magazine to the feeder, blank guides at opposite sides of the feeder, and an actuator, operated in timed relation to the delivering device, to effect relative movement of the guides.

10. In a heel machine, the combination of a blank magazine, an intermittently operated blank feeder, a device for delivering blanks one at a time from the magazine to the feeder, blank guides at opposite sides of the feeder, and means for moving one of the guides toward the other after the delivery of a blank to the feeder.

11. In a heel machine, the combination of a series of lift magazines, a travelling lift collector arranged in co-operative relation to the magazines, guides on opposite sides of the path of the collector between which said collector moves, and means for moving one guide toward the other to justify a pile of lifts after they are collected.

12. In a heel machine, the combination of means for feeding a heel blank in a predetermined path, means for removing the blank from the control of the feeding means, transversely of said path, nailing the blank, and returning it to the feeding means, and means for locking the feeding means against movement while the blank is removed.

13. In a heel machine, the combination of means for feeding a heel blank in a predetermined path, means for removing the blank from the control of the feeding means, transversely of said path, and returning it to the feeding means, and means under the control of the blank removing means for locking the feeding means against movement while the blank is removed.

14. In a heel machine, the combination of means for feeding a heel blank in a predetermined path, a transverse heel transferring slide in said path, means for actuating the slide to remove the heel from the path of the feeding means and to return it thereto, and a locking device controlled by the slide constructed and arranged to lock the feeding means against movement when the slide is transversely displaced from its path.

15. In a heel machine, the combination of a support, means for advancing a pile of lifts along said support, means for removing the pile of lifts transversely to a position at one side of the path of the lift advancing means and returning it to said path, and means for driving a nail in the pile while it is removed from the path of the advancing means.

16. In a heel machine, the combination of a support, means operating to advance a pile of lifts step by step along the support, a nailing device at one side of the path of the advancing means, and means operating between successive movements of the advancing means to transfer a heel pile to the nailing device and return it to the support in the path of the advancing means.

17. In a heel machine, the combination of means for moving a heel blank in a predetermined path, a transverse heel transferring slide in said path, means for actuating the slide to remove the heel from the path of the feeding means and return it thereto, and relatively movable gages on the slide constructed and arranged to grip the blank when the slide begins to move and release the blank when the slide returns to initial position.

18. In a heel making machine, a nailing device, a slide for transferring blanks to the nailing device, relatively movable blank engaging gages upon the slide, means for opening the gages when the slide is retracted from the nailer, a feeder moving transversely of the path of the slide to deliver a blank between said gages when they are open, and means for closing the gages upon the blank as the slide moves toward the nailing device.

19. In a heel machine, the combination of a lift collector, means for operating upon a pile of lifts assembled by the collector, and means located between collecting position and the operating means for discharging a pile of lifts which does not conform to a predetermined standard of height.

20. In a heel machine the combination of a lift collector, means for operating upon a pile of lifts assembled by the collector, a support located in the path of the collector between collecting position and operating position, and means for withdrawing the support and allowing a pile of lifts to fall when it does not conform to a predetermined standard of height.

21. In a heel machine, the combination of a support, a collector constructed and arranged to assemble a pile of heel lifts and advance it step by step along the support, a portion of the support located at a position of rest in the movement of the heel pile being displaceable, measuring means engaging the heel pile at said position, and means controlled by the measuring means for effecting displacement of said portion of the support when the measured heel pile does not conform to a predetermined standard of height.

22. In a heel machine, the combination of lift assembling mechanism, lift nailing mechanism, and means for discharging a pile of assembled lifts from the machine before it is nailed, if it does not conform to a predetermined standard of height.

23. In a heel machine, the combination of a pivoted heel pile support, a latch for sustaining the support, a measuring device constructed and arranged to engage a pile of lifts upon the support, and means controlled by the measuring device for withdrawing the latch and allowing the support to drop when the pile of lifts does not conform to a predetermined standard of height.

24. In a heel machine, the combination of a heel pile support, means for sustaining the support, measuring means constructed and arranged to withdraw the sustaining means and permit the support to drop when the heel pile does not conform to a predetermined standard of height, and means for restoring the support.

25. In a heel machine, the combination of heel molding mechanism and lift assembling mechanism controlled in its operation by the molding mechanism.

26. In a heel machine, the combination of heel molding mechanism and a nailing device controlled in its operation by the molding mechanism.

27. In a heel machine, the combination of mechanism for driving a nail into a heel pile, means for imparting a predetermined form to the nailed heel pile, and connections between said means and mechanism whereby one controls the operation of the other.

28. In a heel machine, the combination of power operated means for imparting a predetermined form to a nailed heel pile, and a separately power operated nailing device controlled in its operation by said means.

29. In a heel machine, the combination of a clutch controlled, power operated heel nailing device, a heel molding device, and connections whereby the nailing device clutch is engaged once by each operation of the molding device.

30. In a heel making machine, the combination of lift assembling mechanism, a nailer, and means for adjusting the assembling mechanism bodily with respect to the nailer.

31. In a heel making machine, the combination of lift assembling mechanism, a nailer occupying a predetermined vertical position, and means for adjusting the assembling mechanism bodily up or down with respect to the nailer.

32. In a heel making machine, the combination of heel pile forming mechanism capable of forming heel piles of different heights, a nailer constructed and arranged to drive a nail at a fixed position, and means for moving the heel pile forming mechanism up or down with respect to the nailer, to present heel piles of different heights properly to the nailer.

33. In a heel machine, the combination of a lift magazine having a delivery opening and a mounting for the magazine including an adjustable caliper so connected to the magazine that measurement of a lift by the caliper will adjust the magazine delivery opening for that lift.

34. In a heel machine, the combination of a magazine support, a lift magazine adjustably mounted upon the support, providing a delivery opening adjustable for lifts of different dimensions, and a lift measuring device comprising lift engaging elements one of which is secured to the magazine and another of which is secured to the support, whereby measurement of a lift between said lift engaging elements and adjustment of the magazine delivery opening for that lift are simultaneously effected.

35. In a heel machine, the combination of a magazine support, a lift magazine adjustably mounted upon the support, providing a delivery opening adjustable for lifts of different thicknesses, a caliper jaw on the magazine, and a co-operating caliper jaw on the support, whereby adjustment of the caliper jaws to the thickness of a lift will adjust the magazine delivery opening to deliver lifts of that thickness.

36. An upright lift magazine constructed and arranged to hold a vertical stack of heel lifts, comprising a stationary section and a hinged section which can be opened to afford access to the interior for the insertion of lifts.

37. A lift magazine comprising a stationary base section and a superposed section having an outwardly opening door.

38. A lift magazine comprising a permanently enclosed base section of sufficient length to hold a supply of lifts sufficient to meet requirements while the remainder of the magazine is being filled, a connected section of greater length having a side opening through which lifts may be inserted, and a closure for the opening.

39. A heel building machine having, in combination, means for supporting a loosely assembled heel, a pair of relatively movable elongated alining members each comprising a plurality of individually spring-pressed sections, and means for advancing the heel between said members to effect an alinement of the component lifts thereof.

40. A heel building machine having, in combination, means for supporting a loosely assembled heel, a pair of relatively movable elongated alining members, each comprising a plurality of individually spring-pressed sections, means for definitely limiting the yielding movement of the sections of one of said alining members, and means for advancing the heel between said alining members to effect an alinement of the component lifts thereof.

41. A heel building machine having, in combination, means for supporting a loosely assembled heel, a pair of elongated alining members, each comprising a plurality of superposed sections individually adapted to adjust themselves to the shape of the heel operated upon, and means for advancing a heel between said members to effect an alinement of its component lifts.

42. A heel building machine having, in combination, means for supporting a loosely assembled heel, a pair of relatively movable, elongated, sectional alining members, and means for advancing the heel rear end first between said sectional alining members to effect an individual alinement of the component lifts thereof.

43. A heel building machine having, in combination, means for supporting a loosely assembled heel, a pair of relatively movable, elongated alining members each comprising a plurality of yieldingly mounted sections, and means for advancing the heel between said alining members to effect an individual alinement of the component lifts thereof.

44. A heel building machine having, in combination, means for supporting a loosely assembled heel, means for engaging the heel, alining means comprising a pair of elongated, spaced walls each composed of a plurality of relatively movable alining members, and means for effecting relative movements of said heel engaging means and said alining members to cause relative movement of the heel with respect to and between said alining members, whereby the component lifts of the heel are individually alined by the wiping action of said alining members thus produced.

45. A heel building machine having, in combination, means for supporting a loosely assembled heel, alining means comprising a pair of elongated spaced walls each composed of a plurality of relatively movable, spring pressed alining members, and means for laterally and individually alining the component lifts of the heel by effecting relative movement of the heel with respect to and between said spring pressed alining members.

In testimony whereof I have signed my name to this specification.

FRED ASHWORTH.